United States Patent
Wu et al.

(10) Patent No.: US 8,649,811 B2
(45) Date of Patent: Feb. 11, 2014

(54) EMBRYO FREQUENCY LEAKAGE FOR PERSONALIZED WIRELESS COMMUNICATION SYSTEM

(76) Inventors: Shiquan Wu, Ottawa (CA); Baohong Sun, Ottawa (CA); Dongxun Jia, Ottawa (CA)

( * ) Notice: Subject to any disclaimer, the term of this patent is extended or adjusted under 35 U.S.C. 154(b) by 327 days.

(21) Appl. No.: 13/067,938

(22) Filed: Jul. 8, 2011

(65) Prior Publication Data
US 2012/0015679 A1 Jan. 19, 2012

Related U.S. Application Data

(60) Provisional application No. 61/344,395, filed on Jul. 13, 2010.

(51) Int. Cl.
*H04W 72/04* (2009.01)
(52) U.S. Cl.
USPC ........... 455/509; 455/101; 455/450; 455/464; 370/329; 370/341; 370/431
(58) Field of Classification Search
USPC ....................................................... 455/509
See application file for complete search history.

(56) References Cited

U.S. PATENT DOCUMENTS

| | | | | |
|---|---|---|---|---|
| 3,946,428 A * | 3/1976 | Anazawa et al. | ............. | 257/664 |
| 4,843,351 A * | 6/1989 | Edwards et al. | ............. | 332/103 |
| 5,158,896 A * | 10/1992 | Burroughes et al. | ............. | 438/87 |
| 5,162,891 A * | 11/1992 | Burroughes et al. | .......... | 257/183 |
| 6,768,364 B2 * | 7/2004 | Wang | ............. | 327/254 |
| 6,910,812 B2 * | 6/2005 | Pommer et al. | ................. | 385/92 |
| 7,251,459 B2 * | 7/2007 | McFarland et al. | ........... | 455/101 |
| 7,863,921 B2 * | 1/2011 | Sonnhueter | ............. | 324/762.02 |
| 2003/0151137 A1 * | 8/2003 | Asano et al. | ................... | 257/724 |
| 2003/0207668 A1 * | 11/2003 | McFarland et al. | .......... | 455/3.01 |
| 2004/0143428 A1 * | 7/2004 | Rappaport et al. | ............. | 703/22 |
| 2004/0236547 A1 * | 11/2004 | Rappaport et al. | ................ | 703/2 |
| 2005/0020298 A1 * | 1/2005 | Masumoto et al. | ........ | 455/552.1 |
| 2009/0075608 A1 * | 3/2009 | Ichitsubo | ................... | 455/127.2 |
| 2009/0091331 A1 * | 4/2009 | Sonnhueter | ................... | 324/537 |
| 2009/0285135 A1 * | 11/2009 | Rousu et al. | ................... | 370/297 |
| 2009/0286569 A1 * | 11/2009 | Rousu et al. | ............... | 455/553.1 |
| 2010/0015936 A1 * | 1/2010 | Mo et al. | ................... | 455/226.1 |
| 2010/0061072 A1 * | 3/2010 | Imazato et al. | ............... | 361/803 |
| 2010/0260082 A1 * | 10/2010 | Lum et al. | ..................... | 370/297 |

* cited by examiner

*Primary Examiner* — Hai V Nguyen

(57) ABSTRACT

An embryo frequency leakage system for personalized wireless communication includes a base station with transceiver transmits and receives at a carrier frequency fl, an apparatus that transmits and receives at frequency fl while purposely leaks at another frequency fe; a handheld that transmits and receives at its embryo frequency fe which preferably at higher frequencies so that the handheld form factor and power consumption can be minimized. In this way, handheld only needs one low power radio therefore is green energy and less danger when pointing to human brain. The handheld will always associate with an apparatus which is deployed within personalized area and has a longer reach by using lower carrier frequencies meanwhile leaks at higher frequencies to create the second communication channel with the handheld.

18 Claims, 6 Drawing Sheets

EMBRYO FREQUENCY LEAKAGE FOR PERSONALIZED WIRELESS COMMUNICATION SYSTEM

CLAIM OF PRIORITY

This patent application claims the benefit of priority from U.S. Provisional Patent Application No. 61/344,396 filed on Jul. 13, 2010. This application incorporates by reference the entire disclosure of U.S. Provisional Patent Application No. 61/344,396.

1. FIELD OF THE INVENTION

The embodiments of the invention relate generally to wireless communication systems and apparatus using embryo handheld frequency leakage.

2. BACKGROUND OF THE INVENTION

Wireless communication, since its birth 100 years ago, has been serving human beings and has brought convenience to all of us. From early Marconi radio to today's cell phones and TV broadcasting, wireless communication is the symbol of modern life style.

In the past 10 years, wireless technology has been booming in an enormous way. There are many wireless standards associated with variety of wireless products that are making peoples' life easier and convenient. Those standards include cellular standards such as GSM (Global System for Mobile), IS-95 (Interim Standard 95)/CDMA2000 (Code Division Multiple Access 2000), 3GPP/UMTS/LTE, WiMax/IEEE 802.16e and local area networks standards such as WiFi/IEEE 802.11, BlueTooth, Zigbee, and UWB/IEEE 802.15 etc.

Typically, a wireless communication system has four major subsystems, i.e. antenna system, radio system, baseband system and MAC processor. Antenna is responsible to pick a signal or to radiate a signal; radio system will select and regulate the interested signal coming down from an antenna or regulate the signal from baseband subsystem before it goes to the air; baseband is the place where the messages get processed such as encoding/decoding, modulation/demodulation, encryption/decryption, filtering etc.; MAC (media access control) will re-format the messages properly either suitable for transmission or suitable for reception.

Radio system is critical in all wireless communications. Radio design and development rely on almost all the sciences from mathematics, physics to materials and industry manufacturing art. In the past 30 years, radio design and implementation have been in remarkable progress and formed a big portion of wireless industry. However, radio design philosophy has no much fundamental progress. We are still following the traditional steps. In transmission side, baseband subsystem formulates the lower frequency signals. Radio subsystem will up-convert the lower frequency signal to a designated higher frequency signal and then amplify it and radiate it from an antenna. The up-conversion usually is realized in multiple stages a.k.a intermediate frequencies (IF). In the receiver side, it is just reverse the procedures of transmitter, i.e. it will down convert the received signal frequency until baseband subsystem can handle it.

According to wave propagation theory, with the same power, lower frequency can propagate longer distance than higher frequency.

In order to transmit longer distance in high frequencies, directional antenna and power amplifier (PA) have to be equipped. On the other hand, using low frequencies need larger dimensional antenna to achieve the optimal transmission and reception. Therefore there is a dilemma for cellular industry. One side people prefer smaller cell phones for portability reasons. On the other side, people like a longer reach so that less base stations needed to build a cellular network. There is an industry trend that broadband cellular systems should move to lower frequency band, i.e. the spectrum below 1 GHz. This kind of frequency re-farming makes the cell phone design a big challenge. It is very common that a handheld has multiple radios built in already. Future's new frequency release will force cell phone makers to integrate more radios into a handheld. It is not only a big waste in building materials, but also a big challenge both in technology and in economy. It may cause health concerns by pointing multiple radios to the brain when making calls.

It is therefore an object of the invention to provide a system and apparatus to make the handheld design less dependent on frequencies changes or independent on frequencies changes.

The foregoing embodiments and advantages of the invention are illustrative that can be implemented by the various exemplary embodiments and are not intended to be exhaustive. Thus, these and other embodiments and advantages of the various exemplary embodiments will be apparent from the illustrations and examples herein or can be learned from the various exemplary embodiments, both as embodied herein or as modified in terms of any variation that are apparent to those persons skilled in the art.

3. SUMMARY OF THE INVENTION

According to one broad aspect, the invention provides an embryo frequency leakage system for personalized wireless communication comprising: the first radio system uses an embryo frequency fe in a confined environment suitable for handheld; the second radio system uses another frequency fl as the normal carrier frequency to transplant the first radio signal; An apparatus communicates with the second radio via frequency fl while communicates with the handheld via the leakage at an embryo frequency fe; The handheld solely relies on an embryo frequency fe which preferably being defined and allocated in much higher frequencies (for example, above 5 GHz) specific for handheld and has no components depending on the long wavelength carrier frequency fl therefore can be very low power and green energy handheld.

In some embodiments, base station transmits and receives at frequency fl and handhelds communicate with base station using an embryo frequency fe and via an apparatus that transmits and receives at frequency fl meanwhile leaks at embryo frequency fe.

According to another broad aspect, an apparatus transmits and receives at lower frequency fl and leaks at embryo frequency fe.

In some embodiments, a handheld generates waveforms at an embryo frequency fe and associates with an apparatus leaks at embryo frequency fe.

We will provide brief summaries of various exemplary embodiments. Some simplifications and omissions may be made in the following summary, which is intended to highlight some aspects of the various exemplary embodiments, but not to limit the scope of the invention. Detailed descriptions of a preferred exemplary embodiment are adequate to those having skills in the art to use the inventive system concepts and methods.

The invention provides systems and apparatus to define a personalized communication ambience wherein the apparatus uses a lower frequency radio for long reach while leaks at the embryo frequency for a personalized ambience.

The invention also provides solutions to wireless cloud computing and spectrum re-farming where lower frequencies are for larger devices preferably keep certain distance from human's brain while higher frequencies are for handheld devices with green energy.

Various exemplary embodiments are systems and methods, and apparatus that exploit the lower frequencies for longer distance reach and higher frequencies for handheld communications devices and communications within a confined area.

4. DESCRIPTION OF DRAWINGS

Figure 3:
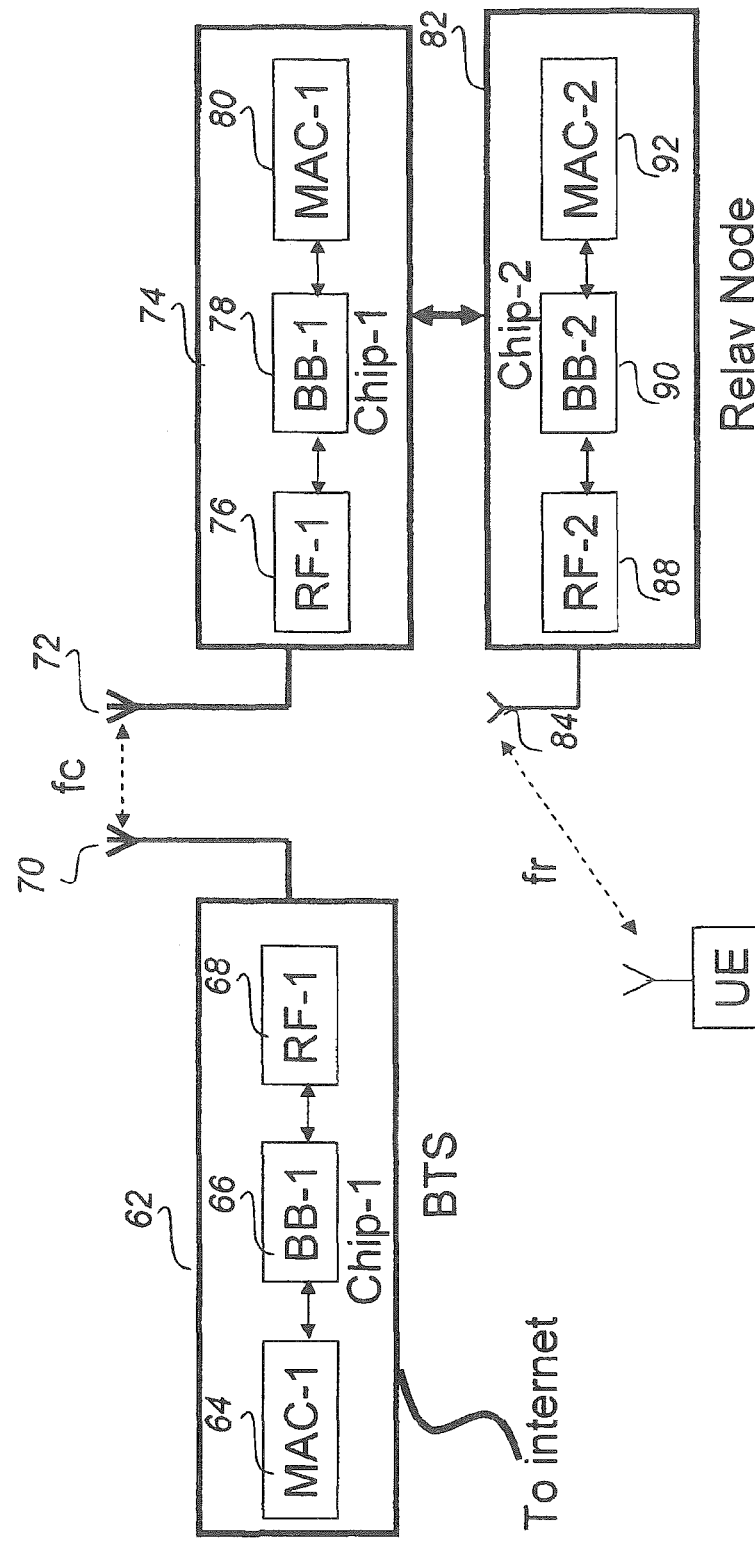

FIG. 3 describes another priori art wherein an access point has integrated 2 radio chipsets. One chipset is responsible to communicate with another access point at frequency fc while another chipset is responsible to communicate with a terminal at a frequency fr.

Figure 4:
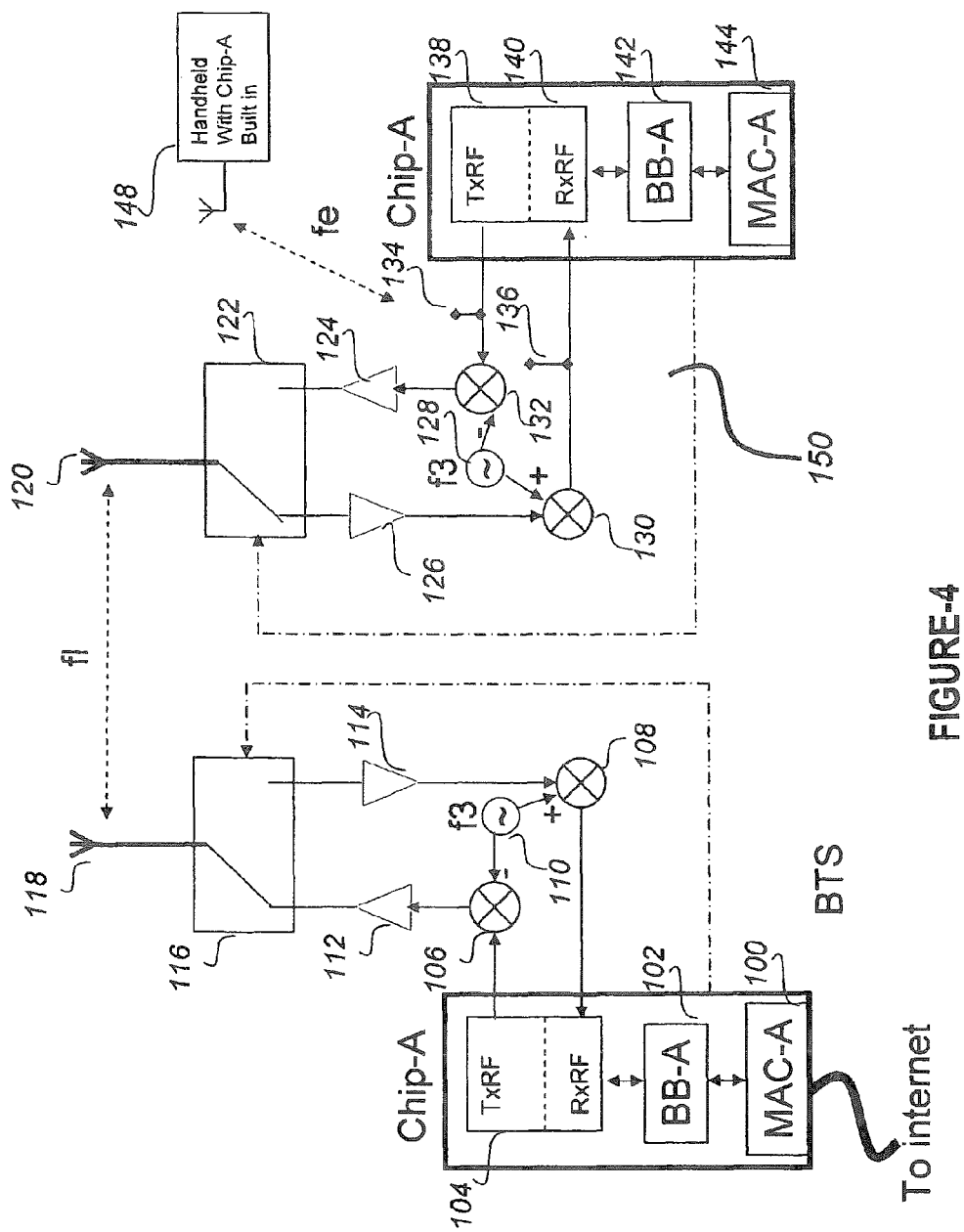

FIG. 4 illustrates one embodiment of the invention. The base station with chipset-A communicates with the apparatus at fl and apparatus having the same chipset-A leaks at frequency fe to communicate with handheld also having a chipset-A.

Figure 5:
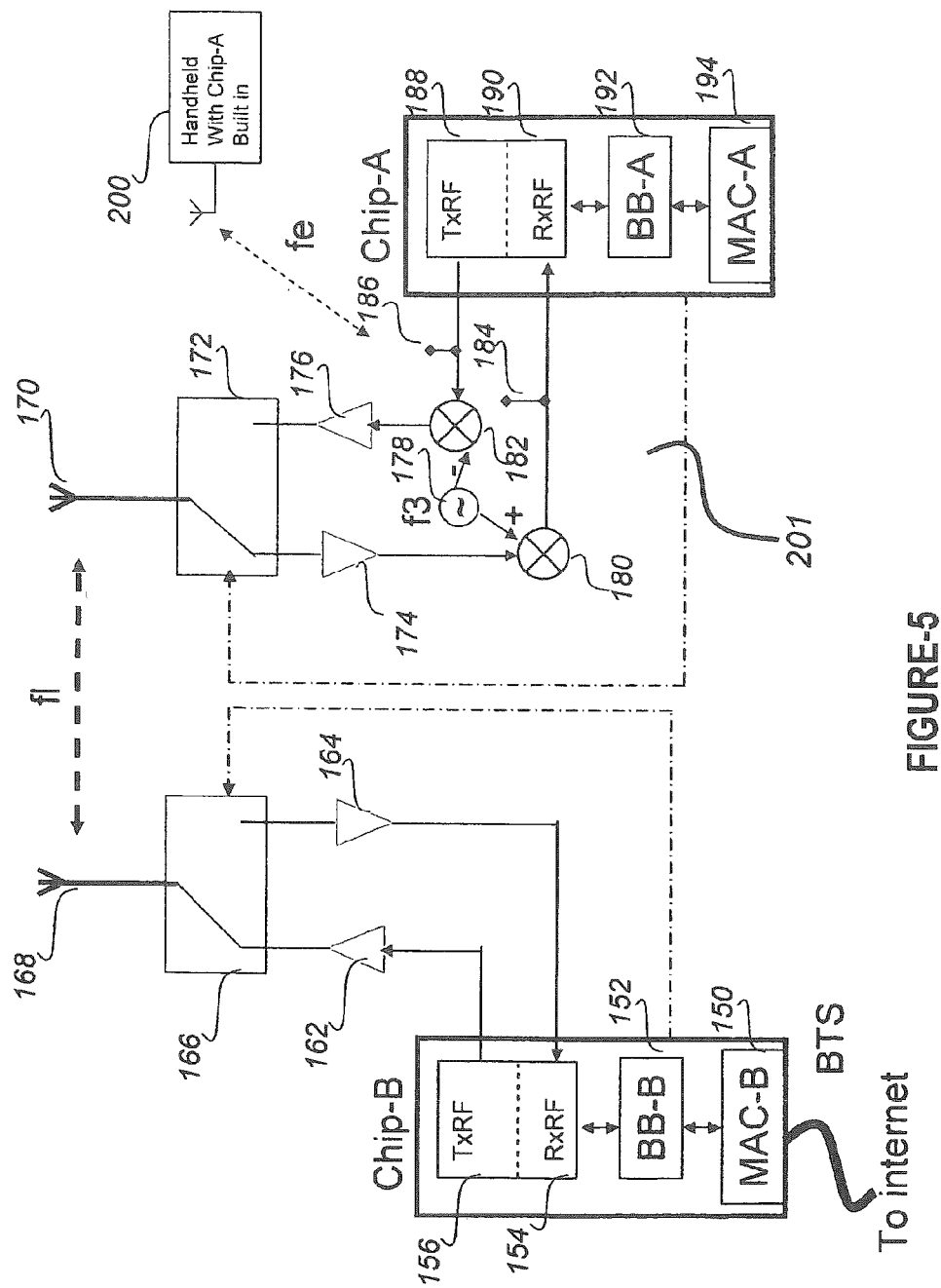

FIG. 5 describes another embodiment of the invention. The base station with chipset-B communicates with the apparatus at fl and apparatus with a chipset-A leaks at frequency fe to communicate with handheld also having a chipset-A.

Figure 6:
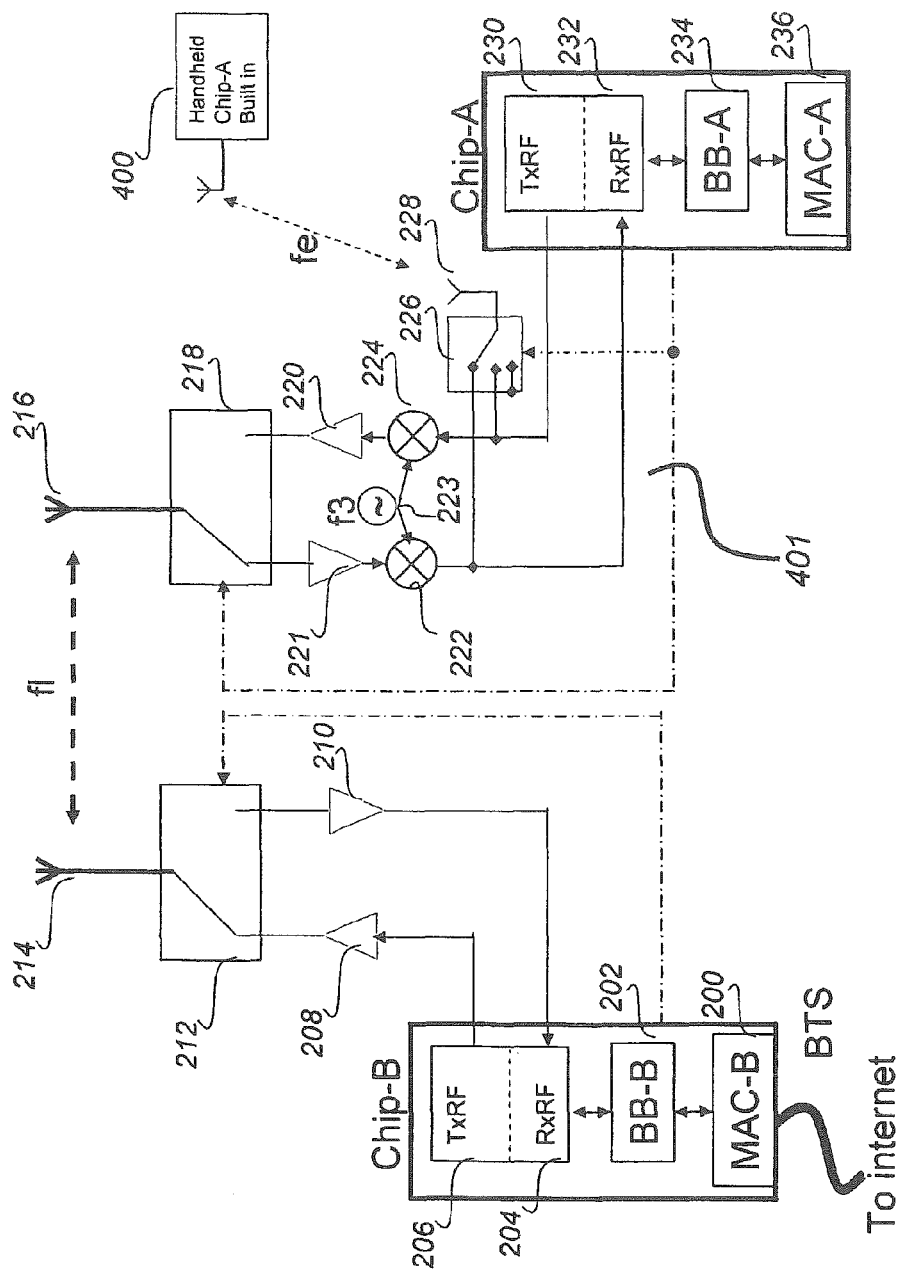

FIG. 6 shows yet another embodiment of the invention that the apparatus has a leaking antenna.

5. DETAILED DESCRIPTION OF THE INVENTION

Wireless communication is to use electromagnetic wave or radio frequency (RF) to carry information over the communication path. For bidirectional wireless communications, one end usually refers to base station (BTS) or access point (AP) and the other end refers to terminals or user equipments (UE). Both BTS and UE have a transceiver unit. Although the design of BTS transceiver unit and UE transceiver unit can be quite different due to different requirements, the common practice is that one end transmits in a carrier frequency fc, the other end must receive at frequency fc. Therefore, the transceiver chipsets designed and manufactured today all associated with a designated frequency or a spectrum. It is very common that a smart phone today has integrated multiple radios such as GSM, CDMA, WCDMA, LTE (long term evolution), WiFi, and BlueTooth etc. These also need multiple antennas and multiple digital signal processors and multiple protocols processors. It is the same in the BTS or AP, each new frequency allocation will result into a new wave of equipments and components design and implementation. Smart handhelds have to follow the industry trend and integrate as many radios as possible in order to claim "smart". This is a big waste in economy and also a challenge in design and manufacturing.

Figure 1:
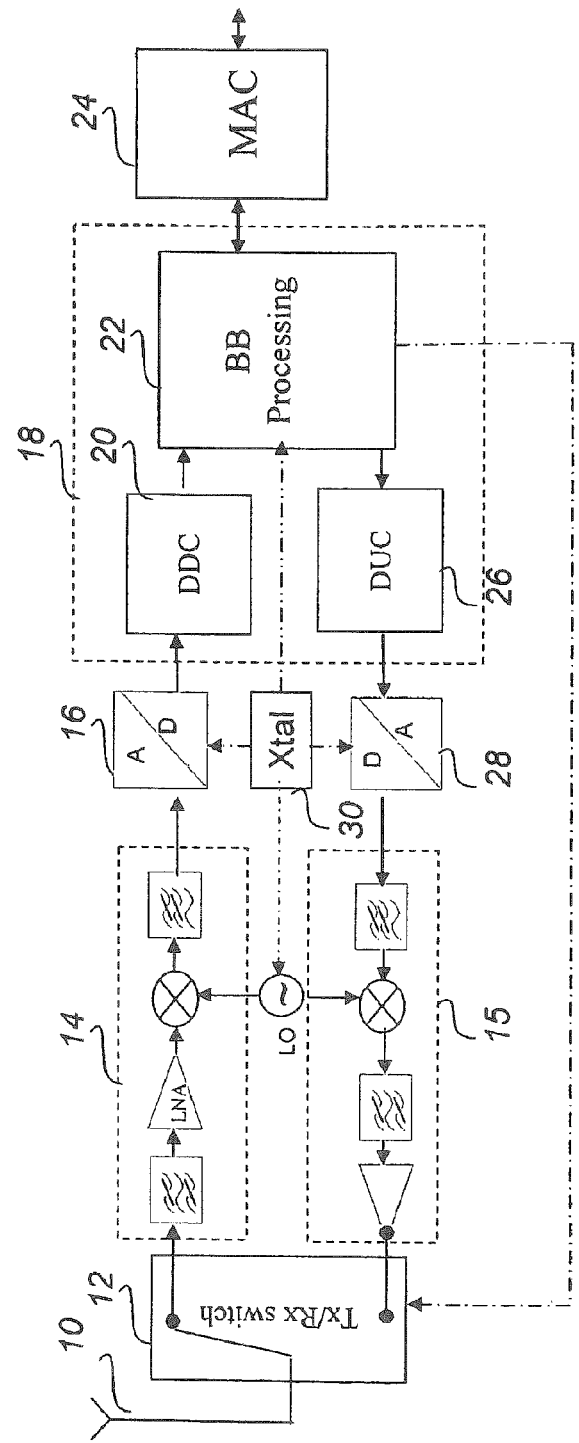
FIG. 1 shows an example of priori art where a traditional wireless communication device diagram.

Referring to FIG. 1, there is an exemplary priori art of wireless transceiver and modem design. Module 10 is the antenna set which transmits and receives signals. Following it is a transmit/receive switch and is instructed by a baseband processing module 22 to turn to receive mode or to transmit mode. Module 14 is the receiving RF subsystem through which the received signal is regulated, converted to an intermediate frequency (IF) and then low-pass filtered to fit for digitization process. By contrary, module 15 is the transmission RF subsystem through which the intermediate frequency analog signal from D/A is up converted, regulated and amplified for radiation. Module 16 is an analog to digital convertor and module 28 is a digital to analog convertor. In general, they form the boundary of the RF chip and baseband chip. Module 30 is a crystal oscillator which provides a reference clock for others. Baseband module 18 is responsible to further regulate the signal, demodulate/modulate the signal, decode/encode the signal etc. MAC module 24 is where the data bits are reformatted and fragmented according to the standards.

Figure 2:
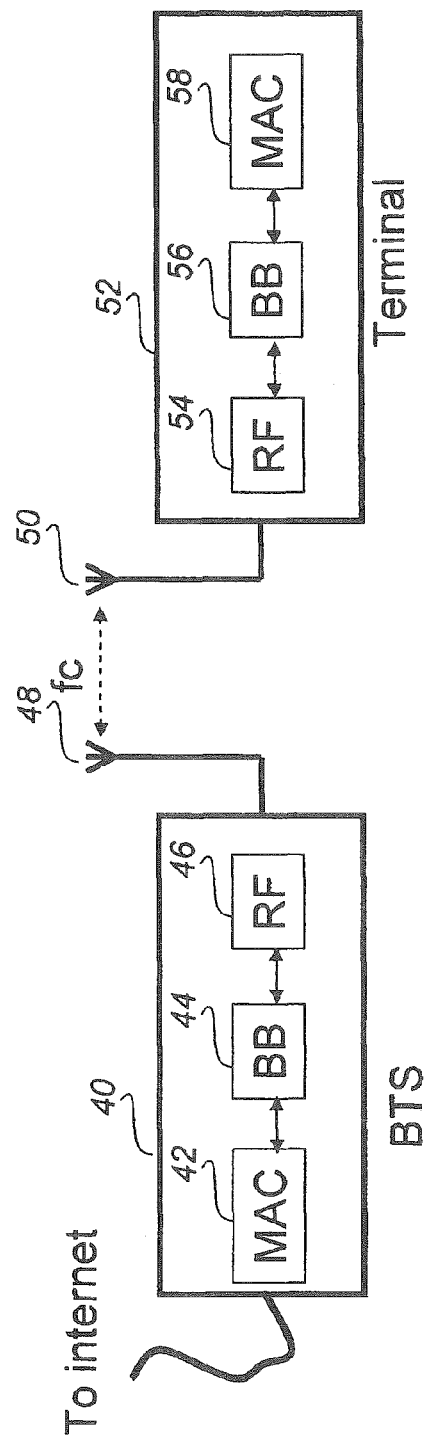
FIG. 2 illustrates another priori art and is popular today, wherein a transmitter transmits information at a frequency fc while a receiver receives the information at the same frequency fc.

Referring to FIG. 2, there is another illustrated priori art where BTS chip and terminal chip modulate/demodulate signals at the same frequency fc.

Referring to FIG. 3, there is yet another illustrated priori art where BTS communicates with terminal via a relay node. The relay node has two chips integrated together. Chip-1 is built with one protocol and can communicate with BTS on frequency fc. Chip-2 is built with another protocol and can communicate with the terminal at frequency fr. There is a protocol convergence process between relay node and terminal.

When BTS has data to send to UE 94, it sends the data to relay node first at frequency fc. Chip-1 will demodulate and decode the data bits and process it and reformat it to fit for Chipset-2 protocol. Then send the reformatted message to Chipset-2 via a wired protocol. Upon receiving it, Chipset-2 will process it using another wireless protocol and then transmits to UE 94 via frequency fr.

When UE has data to transmit, it first transmits the data to relay node using frequency fr. Chip-2 within the relay node will demodulate and decode it, and then Chipset-2 will forward the processed data bits to Chipset-1 via wired interface. Upon receiving the data bits, the Chipset-1 will process it and then transmit it to BTS at frequency fc.

In accordance with an embodiment of the invention, we propose an embryo frequency leakage system for personalized wireless communication comprising: a base station with a transceiver that transmits and receives at a long wavelength frequency fl; an apparatus transmits and receives at frequency fl and purposely leaks at an embryo frequency fe preferably in higher frequency; a handheld with a transceiver transmits and receives at a frequency fe within a confined environment such as a car, home or an office.

Referring to FIG. 4, there is an illustrated wireless system and a leakage apparatus in accordance with an embodiment of the present invention.

A base station connecting to the internet comprises of a chipset-A which may transmits and receives at an embryo frequency fe but will be shielded except the wirings, a frequency down conversion module 106 which changes the signal frequency fe from chipset-A to a carrier frequency fl, a frequency up conversion module 108 will change the received frequency fl back to the embryo frequency fe, a frequency source 110 which provides reference frequency f3 to both down conversion module and up conversion module, amplification modules 112 and 114, a transmit and receive switch 116 and antenna set 118.

An user equipment comprises of a handheld 148 with a chipset-A built in, an apparatus 150 with another chipset-A built in but is shielded by a metal cage except the two leakage spots 134 and 136 which leak the transmit and receive signals at the embryo frequency fe, frequency down conversion module 132 and up conversion module 130, frequency source 128, amplification modules 124 and 126, a transmit and receive switch 122, and an antenna set 120 matching to frequency fl.

When BTS has data to send to handheld 148, the chipset-A built into BTS will generate a signal waveform at the embryo frequency fe, then the signal is pumped out via circuitry and is immediately converted to a signal at frequency fl and is radiated from antenna 118. Therefore BTS has no radiation to the air at embryo frequency fe but it radiates at fl. On the other end, the apparatus will receive the signal at frequency fl via antenna 120. The signal is regulated and its frequency fl is converted back to embryo frequency fe via module 130. The signal will leak out only at leaking point 136 before it propagates to chipset-A built into the apparatus. The leaked signal will be picked up by the handheld 148 and get decoded there and perceived by user. Another copy of the signal getting into the chipset-A of the apparatus maybe get decoded as well but will be dumped or stored or forwarded to handheld 148.

When handheld 148 has data to transmit, it first transmits the data to the leakage apparatus 150. Since handheld uses embryo frequency fe therefore the signal will sneak into chipset-A residing in the apparatus 150 via the leaking point 136. The chipset-A will process it and decode it and determine its final destination. Then the chipset-A will regenerate the signal waveform at embryo frequency fe. The frequency translation module 132 will convert the frequency fe to fl and radiates out from antenna 120. The BTS antenna matched with frequency fl will pick signal up at frequency fl and module 108 converts the signal frequency back to embryo frequency fe. The chipset-A of BTS will decode it and determine the address and deliver it to its next destination.

Apparatus 150 can be hanged on the belt or put into pocket or bag or in the car or fix deployed in home, office, hotspots etc. Handheld maybe always associate with one apparatus and may produce a warning signal whenever it disconnects an apparatus.

Referring to FIG. 5, there is an illustrated wireless system and an apparatus in accordance with another embodiment of the present invention. The wireless system consists of a base station, an apparatus 201 with a chipset-A built in and a handheld 200 with a chipset A built in. The BTS comprises of a chipset-B which transmits and receives at frequency fl. The apparatus 201 comprises of a chipset-A which may transmit and receive at embryo frequency fe but get shielded except the leakage points 184 and 186, frequency translator 180 which converts signal frequency from fl to fe when in receiving mode and frequency translator 178 which converts the signal frequency from fe to fl when in transmit mode, a transmit/receive switch 172 and antenna set 170. The handheld has a chipset-A built in therefore can transmit and receive at frequency fe.

When BTS has data to send to handheld 200, it sends data to apparatus 201 via frequency fl. The antenna 170 will pick up the signal and apparatus 201 first regulates the signal and then translates the signal frequency fl to embryo frequency fe so that chipset-A can demodulate it and decode it. When the signal passing through the leakage point 184, it will sneak out to the air and further propagates to handheld 200 which has the Chipset-A built in therefore it can decode the received signal and presents to the user. The same signal may also flow to another chipset-A built into the apparatus and the signal will also get decoded and the decoded bits will be determined to be forwarded to handheld 200 or buffered or discarded.

When handheld 200 has data to transmit, it first transmits the data to apparatus 201. Since handheld transmits in embryo frequency fe therefore the signal will sneak into chipset-A residing in the apparatus 201 via the leaking point 184. The chipset-A will process it and decode it and determine its final destination. Then chipset-A re-encodes it and re-modulates it and transmits it at the embryo frequency fe through wire or circuit. The frequency translation module 182 will convert the embryo frequency fe to fl and radiates out from antenna 170 and the BTS will pick it up at frequency fl for further delivery.

Referring to FIG. 6, there is an illustrated wireless system and an apparatus in accordance with yet another embodiment of the present invention. The wireless system consists of a base station, an apparatus 401 with a chipset-A built in and a handheld 400 with another chipset-A built in. The BTS comprises of a chipset-B which transmits and receives at frequency fl. The apparatus 401 comprises of a chipset-A which may transmit and receive at the embryo frequency fe but still get shielded except the leakage wirings, the transmit/receive switch 226 and antenna set 228, frequency translator 222 which convert signal frequency from fl to fe when in receiving mode and frequency translator 224 which convert the signal frequency from fe to fl when in transmission mode, another transmit/receive switch 218 which maybe synchronized with another transmit/receive switch 226, and antenna set 216. The handheld has a chipset-A built in therefore can transmit and receive at frequency fe.

When BTS has data to send to handheld 400, it first sends data to apparatus 401 at frequency fl. The antenna 216 will pick the signal up and the apparatus 401 first regulates the signal and then translates the signal frequency fl to fe so that chipset-A can demodulate it and decode it. When the signal propagates along the wire/circuit, one copy goes to transmit/receive switch 226 which is synchronized with primary transmit/receive switch 218, therefore the signal will radiate to the air via antenna 228. The antenna of handheld 400 will pick it up at embryo frequency fe and the Chipset-A built in handheld will decode the received signal. The same signal may also propagate to another chipset-A built into the apparatus and the signal maybe decoded but the decoded bits will be forwarded to handheld 400 or dropped or recorded at the chipset-A of the apparatus.

When handheld 400 has data to transmit, it first transmits the data to apparatus 401. Since handheld transmit at embryo frequency fe therefore the signal will be picked up by antenna 228. The received signal will be pumped into chipset-A residing in the apparatus 401. The chipset-A then processes it and decodes it and determines its final destination. Then chipset-A re-encodes and re-modulates the bits and transmits it through wire/circuit at embryo frequency fe. The frequency translation module 224 will convert the frequency fe to fl and radiates out from antenna 216 and the BTS will pick it up for further delivery.

We claim:

1. An embryo frequency leakage system for personalized wireless communication systems comprising: An embryo frequency leakage apparatus that transmits and receives at frequency fl and purposely leaks at an embryo frequency fe; A Base station that transmits and receives at frequency fl; A handheld that transmits and receives at embryo frequency fe only and communicates with an apparatus via the leakage points.

2. The embryo frequency leakage apparatus as claimed in claim 1 comprising: A chipset-A that may transmit and receive at an embryo frequency fe; a shielding cage that prevent the signal radiates to the air except the designed leakage points; a frequency translator that down converts signal frequency to another frequency fl when in transmission mode and up converts signal frequencies to fe when in reception mode; leakage apparatus that purposely release the signals from the embryo frequency fe; an antenna set to transmit and to receive at frequency fl.

3. The leakage apparatus as claimed in claim 2 further comprising wires expose or open holes without shielding cage.

4. The leakage apparatus as claimed in claim 2 further comprising: coupling wires from transmission circuit and reception circuit; a transmit-and-receive switch which synchronizes with the primary transmit and receive switch (refer to FIG. 6) or in a neutral position (block the leakage); another antenna set to facilitate and manage the signals leakages.

5. The antenna set as claimed in claim 4 further comprising: a controller that can adjust the leakage signal strength.

6. The base station as claimed in claim 1 comprising: A chipset-A that may transmit and receive at the embryo frequency fe; a shielding cage that prevents the signal radiation at the embryo frequency fe except the wirings; a frequency translator that immediately down converts signal frequency from fe to fl or up converts signal frequency from fl to fe.

7. A personalized wireless communication system using an embryo frequency leakages as claimed in claim 1 wherein the base station and leakage apparatus use the same chipset-A designed at embryo frequency fe while they communicate each other at another frequency fl via frequency translators.

8. An embryo frequency leakage system for personalized communication as claimed in claim 1 wherein leakage apparatus further comprising a computation unit and the handheld may send programs via the leakage apparatus to execute program in the communication unit and collect the computation results also via the leakage apparatus.

9. The handheld as claimed in claim 8 may send program via the leakage apparatus to another computation processor either in a base station or in another apparatus and collect the results back still via the leakage apparatus.

10. The handheld as claimed in claim 1 further comprising an alarm unit which maybe triggered by disconnection signal from the chipset built in when it is disconnected with an apparatus.

11. The leakage apparatus as claimed in claim 2 further comprising an alarm unit which maybe triggered by disconnection signal from the chipset built into it when a handheld associated with it stops communication within some predefined time period.

12. The leakage apparatus as claimed in claim 2 further comprising to decode the signal and to determine the signal destination and then re-format the signal to transmit.

13. The leakage apparatus as claimed in claim 2 further comprising to decode the signal and to store it or to discard it.

14. An embryo frequency for handheld as claimed in claim 1 wherein the embryo frequency is allocated above 5 GHz.

15. A spectrum re-farm allocation method comprising: Dividing the spectrum according to handheld components and network element components; all handhelds embryo spectrum is in higher frequency and handhelds will not directly communicate with BTS at its allocated frequency but via embryo frequency apparatus; all BTS or AP spectrum is in lower frequency and BTS or AP will not directly communicate with handhelds at its allocated frequency but via embryo frequency leakage.

16. Handheld embryo spectrum as claimed in claim 15 wherein the embryo frequency is preferably allocated above 5 GHz.

17. BTS spectrum or AP spectrum as claimed in claim 15 wherein the lower frequency is preferably allocated below 2 GHz.

18. Embryo frequency apparatus as claimed in claim 15 communicates with handheld only within 20 meters and alarm will be triggered if apparatus and handheld are separated more than 20 meters.

* * * * *